United States Patent [19]

James, Jr.

[11] Patent Number: 5,451,264
[45] Date of Patent: Sep. 19, 1995

[54] METHOD FOR REMOVING HARDENED CONCRETE

[76] Inventor: Jarvis M. James, Jr., 301 Muriel Hooks Dr., Goldsboro, N.C. 27530

[21] Appl. No.: 222,383

[22] Filed: Apr. 4, 1994

[51] Int. Cl.$^6$ ............................ C23G 1/02; C23G 1/08
[52] U.S. Cl. ..................................... 134/3; 134/22.14; 134/41; 134/42
[58] Field of Search ....................... 134/3, 40, 41, 1, 2, 134/3, 42, 23, 38, 22.1, 22.14; 252/8.553, 20, 51.5 A, 170, 106, 315.2; 52/309.12, 309.17; 606/127; 105/405

[56] References Cited

U.S. PATENT DOCUMENTS 3,577,349  5/1971  Haines ................................. 252/170
4,608,086  8/1986  Dodge .................................. 106/12

FOREIGN PATENT DOCUMENTS 51-005329  1/1976  Japan .

Primary Examiner—Jan H. Silbaugh
Assistant Examiner—Robin S. Gray
Attorney, Agent, or Firm—Rhodes, Coats & Bennett

[57] ABSTRACT

A method and composition for removing hardened concrete from surfaces on trucks, mixers, and other equipment used in the concrete industry. The cleaning composition includes hydroxyacetic acid, a soap agent, and a degreasing agent mixed together in an aqueous solution. In the preferred embodiment, the amounts of each ingredient by percent weight are as follows: 17.5% hydroxyacetic acid, the soap agent 4%, the degreasing agent −2%, and water −76.5% To remove the hardened concrete, the cleaning solution is evenly applied over the surface of the hardened concrete and maintained in contact with the concrete for at least five minutes. The hardened concrete is transformed into soft, puttylike concrete chunks by the cleaning composition. After the hardened concrete has been maintained in contact with the cleaning composition for a sufficient length of time, the soft putty-like concrete chunks are easily brushed or sprayed from the surface.

4 Claims, No Drawings

METHOD FOR REMOVING HARDENED CONCRETE

FIELD OF THE INVENTION

The present invention relates generally to a method and composition for removing hardened concrete, and more particularly to a method and composition for removing hardened concrete build-ups from the surfaces of trucks and other equipment.

BACKGROUND OF THE INVENTION

Trucks, mixers, and other machinery used in the concrete industry develop hardened concrete build-ups on their surfaces during ordinary use. The hardened concrete must be periodically removed to maintain the machinery in proper working condition. Various cleaners are used to remove the hardened concrete from the surfaces of the machinery. The problem with these prior art cleaners is that there cleaning ability is often limited and they can also be unsafe for both the environment and the user.

A cleaning composition and method capable of effectively removing hardened concrete in an environmentally safe manner is needed.

SUMMARY OF THE INVENTION

The present invention is an improved composition and method for removing hardened concrete from the surfaces of trucks, mixers, and other machinery used in the concrete industry. The cleaning composition includes a hydroxy-carbonyl compound that is preferably hydroxyacetic acid.

Hydroxyacetic acid has not been previously known or used in the concrete industry to remove hardened concrete. Instead, the concrete industry teaches that hydroxy-acetic action functions as an agent for controlling the settling time of concrete. The applicant has found that a cleaning composition including hydroxyacetic acid functions to effectively remove hardened concrete. In the preferred embodiment, the cleaning composition includes hydroxyacetic acid, a soap agent, and a degreasing agent which are mixed together in water. The cleaning composition effectively removes hardened concrete in an environmentally safe manner.

The cleaning composition is used to remove hardened concrete build-ups as follows. A user applies the cleaning solution directly to the hardened concrete and spreads the cleaning solution over the area to be cleaned. The cleaning composition is allowed to stay in contact with concrete for a period of time sufficient for the cleaning solutions to penetrate the hardened concrete and transform the hardened concrete into soft, putty-like concrete chunks. Depending on the surrounding temperature and concentration of the hydroxyacetic acid, the cleaning composition should be maintained in contact with the concrete for between 5–30 minutes. The user can then easily brush or spray the putty-like chunks from the surface.

Accordingly, it is an object of the present invention to provide a composition and method for removing hardened concrete build-ups.

Another object of the present invention is to provide a composition and method for removing hardened concrete build-ups in an environmentally safe manner.

Another object of the present invention is to provide a composition and method for removing concrete in a relatively short period of time.

Other objects and advantages of the present invention will become apparent and obvious from a study of the following description which merely illustrative of such invention.

DETAILED DESCRIPTION OF THE PREFERRED EMBODIMENTS

The present invention is a cleaning composition and method for removing hardened concrete from surfaces on trucks, mixers, and other equipment used in the concrete industry. The cleaning composition includes hydroxyacetic acid which is a hydroxycarbonyl compound, a soap agent, and a degreasing agent mixed together in an aqueous solution. The components used in the cleaning composition provide for an environmentally safe composition and method for removing hardened concrete.

Various soap agents and degreasing agents can be used for the cleaning composition, but in the preferred embodiment, the soaping agent is amphotergee-k-2 and the degreasing agent is glycol-ether EB. Through experimentation, the applicant has found that the optimal percentage by weight of each ingredient of the cleaning composition is as follows: approximately 17.5% hydroxyacetic acid, approximately 4% amphotergee-K2, approximately 2% glycol-ether EB, and, approximately 76.5% water. To form the concrete cleaner, a 70% by weight solution of hydroxyacetic acid is mixed with the soap agent and the degreasing agent.

In operation, the method for using the concrete cleaner composition to remove hardened concrete is as follows. A user applies the cleaning composition directly to the hard concrete disposed on the surface to be cleaned. The cleaning solution is applied with a brush and is spread in an even amount over the area to be cleaned. The applied cleaning solution is allowed to remain in contact with the concrete for at least five minutes. In this amount of time, the hardened concrete becomes penetrated and soaked with the cleaning composition. This causes the hardened concrete to be transformed into soft, putty-like concrete chunks by the cleaning solution. The temperature of the surrounding air and concrete can affect the speed in which the cleaning composition transforms the hardened concrete into soft, putty-like concrete chunks. In colder weather, the transformation is slowed and accordingly, the cleaning agent may need to be maintained in contact with the hardened concrete for up to 20–30 minutes.

After the cleaning composition has been maintained and in contact with the hardened concrete for a sufficient length of time, the concrete can easily be removed. The putty-like concrete chunks are removed by brushing with a medium-bristled brush or by a plastic-type scrapper or by spraying the chunks off with pressurized water.

If the build-up of hardened concrete on the surface is excessive, the cleaning solution can be maintained on the concrete for a longer period of time or additional applications of the cleaning system can be provided.

The cleaning solution and method of the present invention provides for an effective, environmentally safe, and economical method for removing hardened concrete from surfaces of trucks, mixers, and other machinery used in the concrete industry. The hydroxyacetic acid acts to effectively penetrate and transform the hardened concrete into soft, putty-like concrete chunks. The soap agent provides a cleaner to help remove dirt and soil from the surface and the degreasing agent helps remove grease from the surface being cleaned. The relative percentages of the ingredients of the cleaning composition has been experimentally determined to provide both an economical and effective cleaning agent for removing hardened concrete.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A method for removing and cleaning hardened concrete from a surface of equipment used in the concrete industry, comprising the steps of:
    (a) applying an aqueous hydroxyacetic acid composition directly to the hardened concrete formed on the surface to be cleaned, wherein the hydroxyacetic acid composition consists essentially of approximately 77% by weight of water, approximately 17.5% by weight of hydroxyacetic acid, approximately 4% by weight of a degreaser agent, and approximately 2% by weight of a soap agent;
    (b) penetrating the hardened concrete with the aqueous hydroxyacetic acid composition by permitting the aqueous hydroxyacetic acid composition to soak into and through the hardened concrete formed on the surface to be cleaned;
    (c) treating the hardened concrete by allowing the aqueous hydroxyacetic acid composition to remain in contact with the hardened concrete for at least five minutes, thereby transforming the hardened concrete formed on the surface into concrete having a soft consistency; and
    (d) removing the concrete having a soft consistency from the surface.

2. The method of claim 1 wherein the step of removing the concrete having a soft consistency includes engaging the concrete with removal means so as to facilitate removal of the concrete from the surface to be cleaned.

3. A method for removing and cleaning hardened concrete from a concrete mixing truck, comprising the steps of:
    (a) applying an aqueous hydroxyacetic acid composition, consisting of approximately 17.5% by weight hydroxyacetic acid, approximately 77% by weight water, approximately 4% by weight of a degreaser agent, and approximately 2% by weight of a soap agent, directly to the hardened concrete formed on the concrete mixing truck;
    (b) penetrating the hardened concrete formed on the concrete mixing truck with the aqueous hydroxyacetic acid composition by permitting the aqueous hydroxyacetic acid composition to soak into and through the hardened concrete formed on the concrete mixing truck;
    (c) treating the hardened concrete by allowing the aqueous hydroxyacetic acid composition to remain in contact with the hardened concrete for at least five minutes, thereby transforming the hardened concrete formed on the concrete mixing truck into concrete having a soft consistency; and
    (d) removing the concrete having a soft consistency from the concrete mixing truck.

4. The method of claim 3 wherein the step of removing the concrete having a soft consistency includes engaging the concrete with removal means so as to facilitate removal of the concrete from the concrete mixing truck.

* * * * *